Jan. 18, 1927.

F. L. FURBUSH 1,614,786

CONVEYER CHAIN

Filed May 14, 1924

Inventor:
F. L. Furbush
By Southgate & Southgate
Attorneys.

Patented Jan. 18, 1927.

1,614,786

UNITED STATES PATENT OFFICE.

FRANK L. FURBUSH, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

CONVEYER CHAIN.

Application filed May 14, 1924. Serial No. 713,335.

The principal object of this invention is to improve the links of a conveyer chain so as to provide for easy and convenient assemblage and reduce the cost of manufacture, but especially to reduce the wear on the pivots, increase the durability of the chain, and reduce the time lost in repairs.

Reference is to be had to the accompanying drawings in which—

Figure 1:
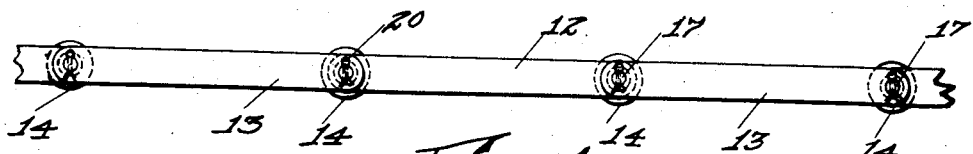
Fig. 1 is an edge view of a conveyer chain constructed in accordance with this invention.
Figure 2:
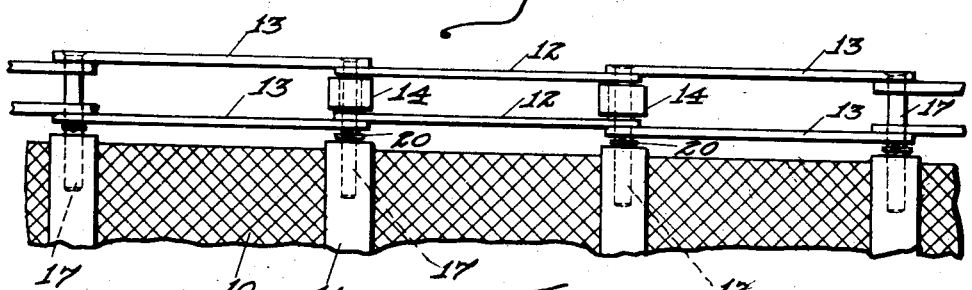
Fig. 2 is a plan showing its connection with the apron.

As ordinarily constructed, a conveyer apron 10 of flexible material or wire is supported by cross pieces 11 and these are carried by chains at the two sides connected by pivot pins 17. Each chain comprises alternate pairs of inner links 12 and connecting outer links 13. Ordinarily the pivot pins are placed through the four adjacent ends of two connected pairs of links and rollers 14 are mounted free to turn on these pins. The wear of the constantly rotating rollers which travel on tracks, is concentrated on the pins, therefore, and these pins wear out and have to be removed and replaced.

This invention involves a new construction for this purpose. Two of the links 12 which are of the same length are separated by a pair of integral cylindrical projections 15 on one of them. These projections are formed as a hub in the process of manufacture and provided with a cylindrical perforation 16 all the way through. This is done by malleable casting or forging operations and it leaves these projections or bearing hubs of uniform shape. The other link 12 of the pair is merely provided with two perforations of the same size and distance apart as the perforations through the hub and it is entirely flat and uniform from end to end. The two links 12 are spaced the proper distance apart by the hubs.

Figure 3:
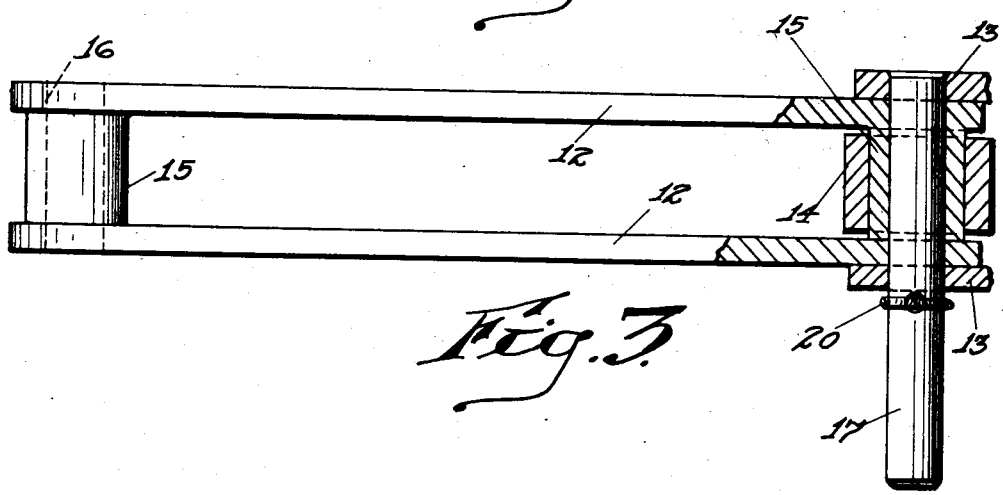
Fig. 3 is a plan on enlarged scale partly in section of one pair of links.

In assembling, a pin 17, headed over on one of the links 13, is placed through the perforation in the hub 15 and the adjacent link 12 as shown at the right in Fig. 3 and through a perforation in the end of the corresponding link 13. The roller 14 is bored out to larger diameter inside than heretofore and placed on the hub 15 where it is held between the links. A cotter pin 20 or other usual fastening device is provided for preventing the links 13 from being displaced too far on the pin. The inner end of the pin extends into one of the cross bars 11 as has been the case heretofore.

By this construction the rollers 14 are mounted to turn on the stationary hubs 15 instead of the pins and the wear comes on the hubs therefore which are part of the link. The pin is worn only by the links as they pass around the drums or wheels at the ends of the endless conveyer and not by the rollers. Therefore the wear is divided and does not all occur at the same point and the pins will last very much longer.

It is not merely the replacement of the pins themselves that is important here but especially the reduction of the time lost in taking the parts out and putting them in and stopping the whole machine, which is a very large one, while this operation is being performed. This constitutes an important economy in industries using long endless conveyers of this type, particularly in drying and conveying machinery for textile and other materials.

Although I have illustrated and described only a single form of the invention I am aware of the fact that modifications can be made therein by any person skilled in the art without departing from the scope of the invention as expressed in the claim. Therefore I do not wish to be limited to all the details of construction herein shown and described but what I do claim is:—

In a conveyer chain, the combination with alternate pairs of outer links and inner links projecting between them, one adjacent to each of the outer ones, all the outer links and one of the inner links of each pair being flat and plane from end to end and perforated at their two ends, the other inner link having integral hubs of the same length at its ends extending from that link to the other inner link to space them apart equally at both ends and perforated therethrough, and a pin headed over on one of the outer links, passing through the perforations to hold the four links pivotally together, detachably connected to the other outer link, and projecting beyond the links to act as a pivot pin for other mechanism.

In testimony whereof I have hereunto affixed my signature.

FRANK L. FURBUSH.